March 20, 1934.  M. G. BEARD  1,951,783
INSTRUMENT BOARD LIGHTING DEVICE
Filed April 5, 1932
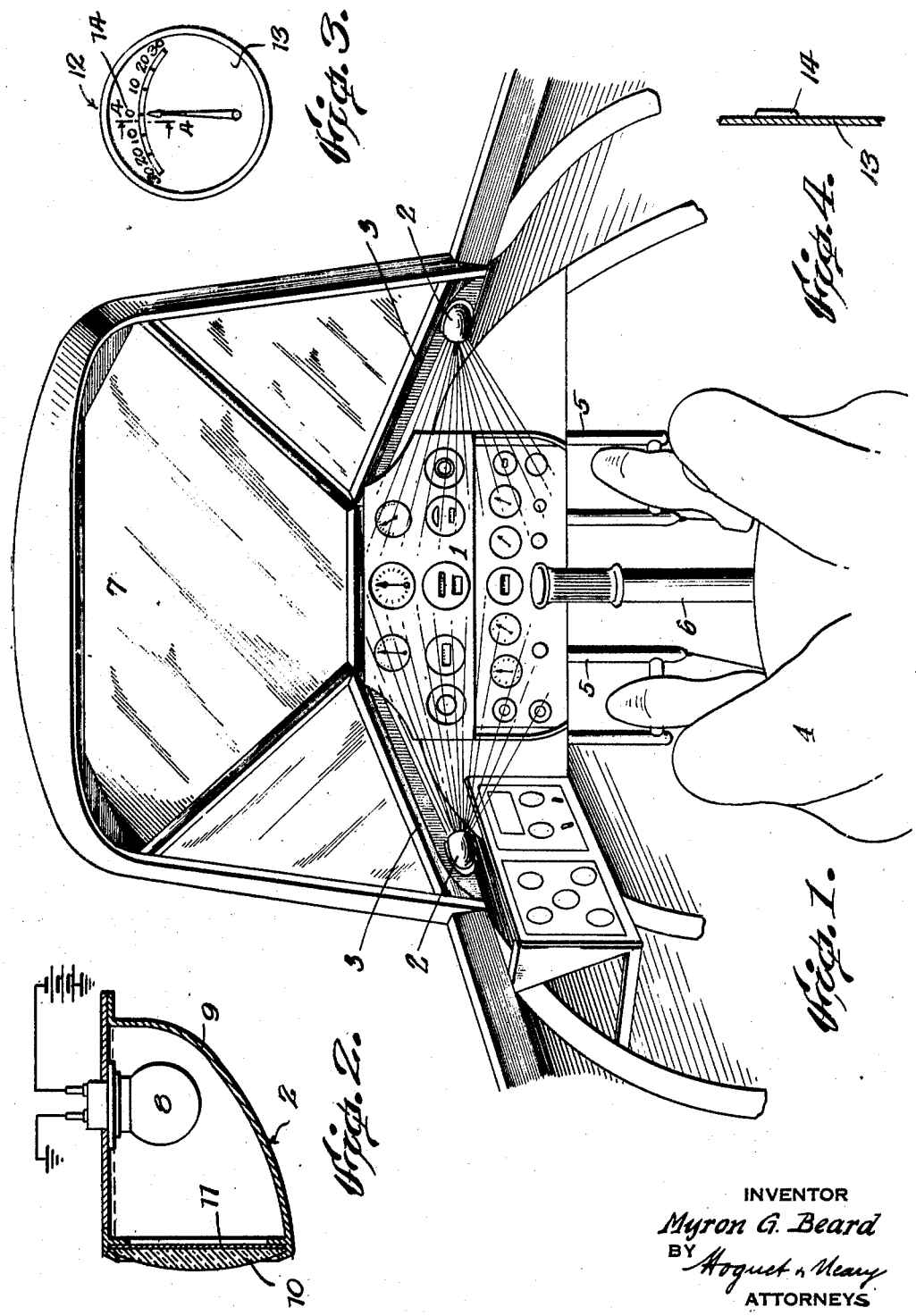
INVENTOR
Myron G. Beard
BY
ATTORNEYS Patented Mar. 20, 1934

1,951,783

UNITED STATES PATENT OFFICE 1,951,783

INSTRUMENT BOARD LIGHTING DEVICE

Myron G. Beard, Farmingdale, N. Y., assignor, by mesne assignments, to Curtiss Aeroplane & Motor Company, Inc.

Application April 5, 1932, Serial No. 603,308

1 Claim. (Cl. 240—8.16)

This invention relates in general to instrument board lighting devices, and more particularly to such a device as will be suitable for use in connection with airplane instrument boards.

Heretofore it has been the common practice to provide the airplane instrument dials and pointers with luminous paint or with shielded lights, or both, in order that the pilot while flying in darkness might be able to read them. The difficulty with the use of luminously painted dials and pointers alone without lights is that in any other situation than total darkness such luminous paint is ineffective. In other words, in partial darkness the obscureness of the dial indications is not compensated for by the luminous paint. In the event that ordinary shielded lights are used difficulty also arises. These light bulbs are usually dimmed down as far as possible so that the pilot will see as little light as is necessary to clearly illuminate the face of the instrument dials. When dimmed to this extent, the electric light bulbs throw a light which is rich in red and yellow rays. For night flying these rays are the most blinding to the pilot's eyes and no matter how low the lights are dimmed there is still sufficient light to spoil the keenness of eye perception by the pilot as he looks out into the darkness after having referred to his instrument board.

It is therefore an object of this invention to provide a lighting arrangement by which the instrument board may be adequately lighted whenever its illumination is required without the existence or production of any attending glare, which would interfere with the pilot's optical perception by reason of reference to the instruments.

Another object is to provide such a lighting arrangement that will be simple in construction, arrangement, installation and operation, and which will be effective and efficient under any and all conditions and circumstances.

A further object is to provide such a lighting system that will eliminate rather than merely shield the harmful rays of the spectrum tending to cause glare and the consequent eye strain resulting in keenness of optical perception.

A still further object is to provide such a lighting system that will eliminate the reflection of confusing lights.

To this end, it is proposed to provide an instrument board to include such instruments as required by the pilot in flying the airplane. This invention does not concern the construction of the instruments but such mention is made to impress the fact that the present modern transport airplane is equipped with a multiplicity of instruments which must be carefully watched and that it is important that quick and accurate reference may be made to any and all of them. It is also proposed to provide the indicia and pointers with luminous paint so they may be seen in the dark. It is further proposed to arrange sources of light completely shielded from the pilot's eyes, and to provide means for filtering out the red and yellow rays and allow only the rays of the ultra-violet end of the light spectrum which are practically invisible to the naked eye. It is further proposed to so train such rays on the instrument board that all of the instruments will be subjected thereto and that the luminous paint thereon will be excited sufficiently to make them clearly visible.

With the foregoing and other objects in view, the invention consists in the combination of parts and in the details of construction hereinafter set forth in the following specification and appended claim, a certain embodiment thereof being illustrated in the accompanying drawing in which Fig. 1 is a view in perspective of the pilot's cockpit, showing the instrument board and the lighting arrangement.

Fig. 2 is a diagrammatical view in cross section through one of the light source assemblies;

Fig. 3 is a detail view of one of the instruments of the dashboard;

Fig. 4 is a detail view in vertical cross section of the instrument face showing the coating of luminous material applied to one of the indicia.

Referring more particularly to the drawing, the instrument board is indicated at 1 and the showing in the drawing of the number and arrangement of instruments thereon is fairly representative. The indicia on the face of each of the instruments and the pointers, or the like, are all painted with suitable luminous material of the type clearly visible in the dark.

The lights generally indicated at 2 are arranged on either side of the pilot at any convenient place on the cabin frame 3. Each light consists of an electric light bulb 8 as a source of light, which is concealed from the view of the pilot by the casing 9 within which it is contained. The inside of the casing 9 is further provided with any suitable accepted type of reflector for reflecting the light rays so as to effectively flood the entire instrument board and all the instruments such as shown at 13, the indicia of which are coated with luminous substance, such as shown at 14 in Fig. 4. However, a suitable filter 11 of any suitable, known and accepted type, is arranged in the casing in front of the bulb and rearward of the lens 10 which will filter out the red and yellow rays of the spectrum and allow the penetration therethrough of the ultra-violet rays which is practically invisible.

The illustration in the drawing denotes generally the relative position of the pilot 4 and the conventional rudder operating stirrups 5 and joystick 6 with the instrument board and instruments and the windshield or transparent enclosure 7. It will be appreciated from this representative showing that the necessity for clear vision by the pilot in many different directions involves the use of a considerable amount of glass window paning.

The use of the conventional instrument board lighting arrangements results in both optical and structural difficulties. In the conventional system the instrument board has the lights set behind a shield and the shield is placed as close as possible to the face of the instrument without shutting out all of the light but leaving sufficient light to illuminate the face of the instrument. There are three bad features about this system of lighting, the first being that the instruments are usually so crowded together that one light is utilized for illuminating three or four instruments, and unless each instrument has about three such lights, the face of the instrument is unevenly lighted. Second, in order to get the proper degree of light, they are dimmed by hand control rheostat so that the pilot is supposed to obtain any degree of lighting he may desire. The pilot, in desiring to rid himself of all unnecessary light so that it will not be reflected about the glass window paning of the enclosure, dims down the light to a maximum degree without completely putting it out. In this condition the light given to the instrument is rich in red and yellow rays since the bulbs are very dim, which are readily reflected so as to blank the window paning with reflected lights so as to make it virtually non-transparent. Such reflected light is further not easily discernible from ground lights to which reference must be intermittently made by the pilot for the purpose of orientation, both as to his location and in order to assure himself that he is flying on even keel. Thirdly, it has been found that with such a system it is almost impossible to uniformly light the instruments. In airplane construction, the lightness of material is very essential and consequently any fine adjustments made between the shield and the instrument board are anything but permanent, and when such fine structural adjustments are disturbed in the handling of the airplane, the entire instrument board lighting system is thrown out of line and is practically unusable.

It has been found as a result of actual experimentation that my arrangement shown in the drawing and described above not only performs satisfactorily but also constitutes a system whereby the desired results can be obtained without the usual attending difficulties. First of all, there is no difficulty in arranging the lamps 2 so that they will be completely shielded from the pilot's eyes. It is well known that the red and yellow rays of the spectrum may be filtered out from the light thrown off by a lighted electric light bulb, which filter will be capable of allowing the penetration of only the rays of the ultra-violet end of the light spectrum which are known to be practically invisible to the naked eye. The present system insures a flood of light for all of the instruments on the entire instrument board, and it has been further found that the ultra-violet rays possess the characteristics necessary to excite the usual luminous paint applied to instruments for the original purpose of making them visible in the dark. Further, by the use of these rays, the condition of total darkness is no longer necessary to make the luminous painted objects visible. This is of extreme importance because there are many instances in flying when the instruments are not clearly visible and yet the condition of total darkness has not yet arrived. Of further importance is the fact that there is no attending difficulty, by reason of any reflection of the rays of the ultra-violet end of the light spectrum which emanate through the light filter, because of the fact that they are not only virtually invisible to the naked eye but they are, if seen at all, consequently easily distinguishable from ground lights.

A further structural advantage of the present system arises out of the fact that bulbs may be readily replaced without upsetting any fine adjustments. This is of importance because in the conventional system calling for the installation of light bulbs on the instrument board, such bulbs are very susceptible to filament breakage, due to the fact that the instrument board receives considerable vibration at all times during flight.

I do not wish to limit myself to a selection of any particular type of luminous substance nor even to a selection between substances which are self-luminous and those which depend upon light excitation to become luminous. I may employ such substance as will be normally non-luminous but excited by the rays of the ultra-violet end of the light spectrum so as to become luminous. Or I may employ a self-luminous substance, the visibility and lasting qualities of which are substantially increased by the light rays to which I subject it.

I claim:

In combination, an instrument board of an airplane having graduations, pointers and similar indicating elements, said indicating elements being coated with a substance rendered visible in the dark when acted on by ultra-violet light, two sources of light, positioned outside the instrument board and located to the right and left, respectively, of the pilot's seat, a filter for each light source positioned between the light and the instrument board for allowing the passage only of ultra-violet light, each light being arranged to direct ultra-violet rays only onto substantially all the indicating elements on the instrument board, whereby in the event of failure of either light, the other will serve to illuminate substantially all the indicating elements on the instrument board, and means to shield each light from the eyes of the pilot.

MYRON G. BEARD.